United States Patent
McCormick et al.

(10) Patent No.: US 6,535,629 B2
(45) Date of Patent: *Mar. 18, 2003

(54) STEREOSCOPIC IMAGE ENCODING

(75) Inventors: Malcolm McCormick, Sheffield (GB); Neil Davies, Goole (GB); Amar Aggoun, Beeston (GB); Matthew Charles Forman, Cheltenham (GB)

(73) Assignee: De Montfort University, Leicester (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/043,393

(22) PCT Filed: Sep. 13, 1996

(86) PCT No.: PCT/GB96/02261
§ 371 (c)(1),
(2), (4) Date: Jun. 12, 1998

(87) PCT Pub. No.: WO97/10675
PCT Pub. Date: Mar. 20, 1997

(65) Prior Publication Data
US 2002/0054705 A1 May 9, 2002

(30) Foreign Application Priority Data
Sep. 16, 1995 (GB) ............................... 9518984

(51) Int. Cl.⁷ ................................. G06K 9/46
(52) U.S. Cl. ........................ 382/154; 382/236; 382/250
(58) Field of Search ............................. 382/154, 173, 382/232, 236, 250, 253, 285; 345/6, 202; 348/42, 43, 49, 59, 400–407, 410, 420, 421, 411–418; 359/463, 458; 352/58; 396/330

(56) References Cited

U.S. PATENT DOCUMENTS

| 5,537,492 A | * 7/1996 | Nakajima et al. ........... 382/232 |
| 5,675,377 A | * 10/1997 | Gibas .......................... 348/47 |
| 5,719,620 A | * 2/1998 | Allio ........................... 348/49 |
| 5,774,589 A | * 6/1998 | Aritake et al. .............. 382/232 |

OTHER PUBLICATIONS

Matthew C. Forman et al., A Novel Coding Scheme for Full Parallax 3D–TV Pictures, IEEE publication, pp. 2945–2947, 1997.*
I. Jalloh et al., A 3D DCT Architecture for Compression of Integral 3D Images, IEEE publication, pp. 238–244, 2000.*
M. Forman et al., Compression of Integral 3D TV Pictures, 5th International Conference on Image Processing and its Applications, Jul. 4, 1995, pp. 584–588.*
Edward H. Adelson et al., Single Lens Stereo with a Plenoptic Camera, IEEE Transactions on Pattern Analysis and Machine Intelligence, vol. 14, No. 2, pp. 99–106, Feb. 1992.*
M. McCormick et al., Restricted Parallax Images for 3D T.V., IEEE Colloquium on Stereoscopic Television, pp. 3/1—3/4, 1992.*
M. McCormick, Examination of the Requirements for Autostereoscopic, Full Parallax, 3D TV, International Broadcasting Convention, Conference Publication No. 397, pp. 477–482, Sep. 1994.*

* cited by examiner

*Primary Examiner*—Brian Werner
(74) *Attorney, Agent, or Firm*—Charles D. Gunter, Jr.

(57) ABSTRACT

There is disclosed a method for storing and/or transmitting 3D image information comprising the steps of: producing an image to be stored and/or transmitted comprising an array of strongly correlated neighbouring sub-images; casting the sub-images on to a pixel screen capturing the sub-images as electronic data; compressing the electronic data by eliminating redundancies associated with the sub-images; storing and/or transmitting the compressed data; the compression being reversible so as to expand the data to re-create the sub-images for viewing as a 3D image through an optical viewing system comprising a microlens or lenticular array.

13 Claims, 5 Drawing Sheets

STEREOSCOPIC IMAGE ENCODING

This invention relates to storing and/or transmitting 3D images. 3D images can be formed in a variety of ways. No matter how they are formed, there is substantially more information content in a 3D image than in a corresponding 2D image—the depth information is additional. Storing and/or transmitting 3D images therefore is more demanding of storage space or bandwidth than for 2D images, much as colour images are more demanding than monochrome images. Coloured 3D images would appear on the face of it to be very demanding, but the problems can be eased by data compression techniques, surprisingly to such a degree as brings 3D television into immediate prospect.

Methods for making (and viewing) 3D images—autostereoscopic images, i.e. not requiring aids such as spectacles to view—are known and involve the use of an optical imaging system comprising a microlens array of small spherical or lenticular (i.e. cylindrical) lenses. Such imaging techniques produce images which are particularly well adapted, as it turns out, to compression, and the present invention is particularly concerned with such imaging techniques.

The invention comprises a method for storing and/or transmitting 3D image information comprising the steps of:
  producing an image to be stored and/or transmitted comprising an array of strongly correlated neighbouring sub-images;
  casting the sub-images on to a pixel screen capturing the sub-images as electronic data;
  compressing the electronic data by eliminating redundancies associated with the sub-images;
  storing and/or transmitting the compressed data;
  the compression being reversible so as to expand the data to re-create the sub-images for viewing as a 3-D image through an optical viewing system comprising a microlens or lenticular array.

The image may be of a scene and produced using an optical imaging system comprising a microlens or lenticular array of small spherical or cylindrical lenses each of which images the scene from a slightly different viewpoint.

The image may however be electronically generated or partially electronically generated. Photographic images may be electronically scanned and captured as electronic data.

Small sub-image data sectors generated by the optical system are fed successively into an encoder where a previously fed sub-image is substracted from the most recently fed-in sub-image by a differential pulse code modulation (D P C M) coding technique to remove redundancies between the sub-images.

Redundancies may be eliminated within the sub-images themselves by techniques for example normally used in compression of two dimensional image data such for example as a discrete cosine transform (DCT) coding scheme.

A 3D-DCT coding scheme may be applied directly to groups of sub-images, the use of the third transform dimension eliminating inter-sub-group redundancies with the first two transform dimensions used to remove intra-sub-image redundancies.

A quantisation function may be applied to the coded data that sets small values to zero and transforms all other non-zero values to nearest values in a set of preferred values.

The coded data may then be entropy encoded.

The above coding schemes are suitable for compressing still image data. For storing and/or transmitting moving 3D image information a DPCM/3D-DCT coding scheme may be used, the DPCM coding decorrelating image data in the temporal domain and the 3D-DCT scheme eliminating spatial redundancies.

A hybrid DPCM2/DCT scheme may be used for compression of moving 3D image information, in which a 2D-DCT scheme decorrelates and hence removes redundancies within each sub-image and two DPCM loops are used, one to remove redundancies between sub-images in a spatial sense while the second is used to remove temporal (interframe) redundancies.

Both of these moving 3D-image compression schemes may make use of motion compensation to achieve greater overall image reduction.

Methods for storing and/or transmitting 3D image information according to the invention will now be described with reference to the accompanying drawings, in which.

The drawings illustrate methods for storing and/or transmitting (and, of course, displaying or replaying) 3D image information.

Figure 1:
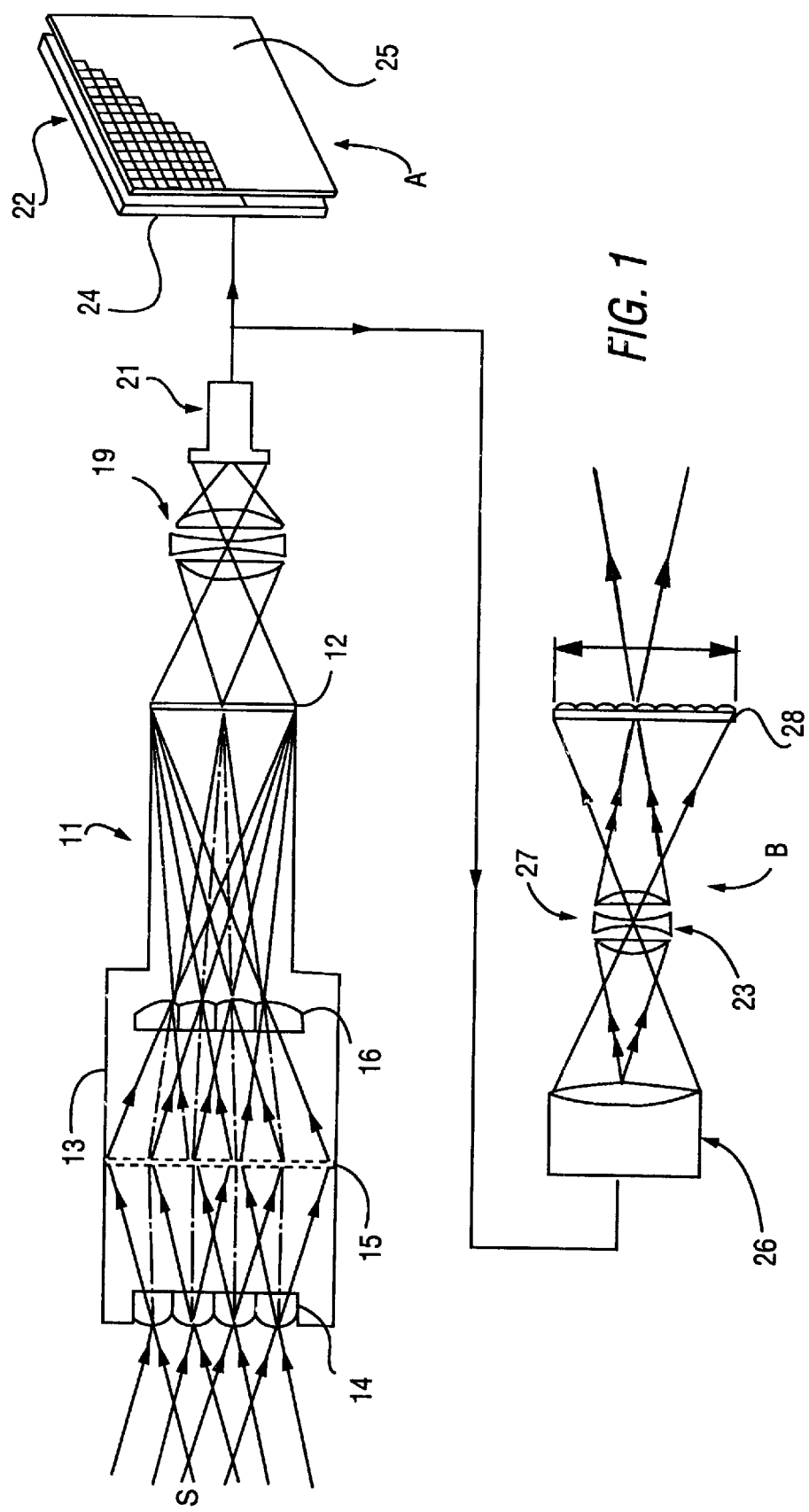
FIG. 1 is a diagrammatic illustration of an optical system casting an image on an electronic imaging device and display arrangements for images therefrom.
Figure 2:
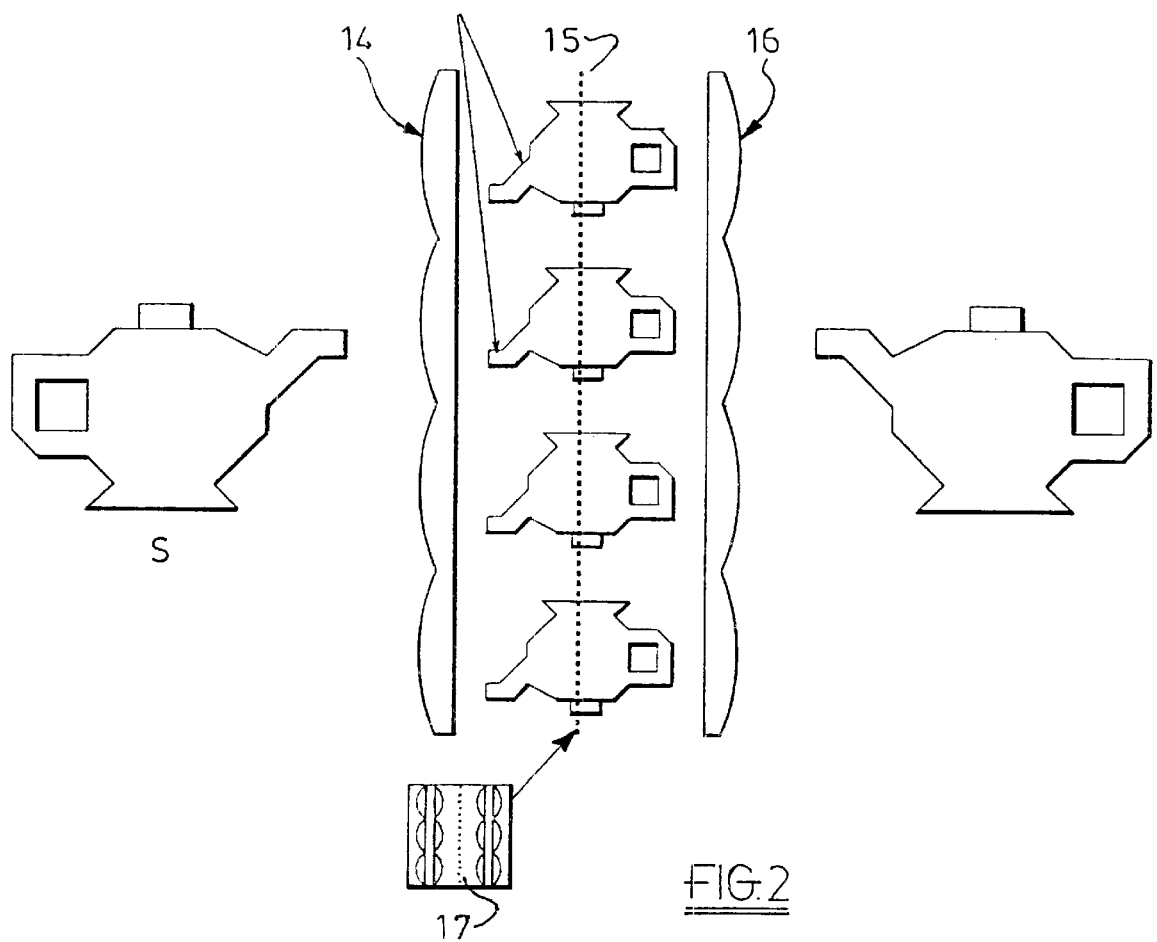
FIG. 2 is a diagrammatic illustration of the imaging process in the optical system of FIG. 1.

FIGS. 1 and 2 illustrate imaging a scene S to be stored and/or transmitted using an optical imaging system 11 comprising a microlens or lenticular array 12 of small spherical or lenticular (i.e. cylindrical) lenses each of which images the scene S from a slightly different viewpoint to produce an array of strongly correlated sub-images.

The optical imaging system 11 comprises a front-end optical arrangement 13 comprising a segmented wide aperture input lens 14, a microtelescopic array 15 (a double integral, autocollimating microlens array, see FIG. 2), and a segmented output macrolens array 16.

As seen in FIG. 2, each segment of the input lens array 14 individually transposes its image at the focusing screen 17 of the array 15 (see FIG. 2). The screen 17 comprises a double microlens screen. Each segment of the output lens array 16 projects the transposed images to be superposed at a particular plane. The initial transposition and projection will also produce a reversal of parallax between the individual superposed image fields. As the initial transposed image is formed on the double integral microlens screen 17 it is presented to the output lenses as a spatially reversed 3D optical model. The resulting superposed 3D image is constructed from the integration of all the spatially reversed optical models projected by each lens segment, and consequently continuity of parallax throughout the viewing angle is achieved.

The recorded image is a planar 2D image, which contains all the 3D information relating to the scene S. This image, cast on the microlens encoding screen 12, is reduced in size by a copy lens arrangement 19 to form a reduced image on an electronic image capture device such as a high resolution CCD array 21. The same can be achieved by imaging directly on to a high resolution CCD array which is overlayed with a microlens encoding system.

FIG. 1 also illustrates image viewing arrangements, namely a flat panel display 22 and a projection display 23 for viewing the image captured by the device 21 as a 3D image. The flat panel display 22 comprises a high density pixel screen 24 (which may be a liquid crystal display panel or a cathode ray tube or a gas plasma screen) with an adjacent lens array 25 which acts as a decoding screen to decode the coded information produced by the encoding screen 12.

The projection arrangement 23 comprises a high resolution video screen 26 and a projection lens arrangement 27 projecting the coded image on the screen 26 on to an integral back projection decoding screen 28 by which the observer sees a 3D image. A light valve/LCD arrangement may be used in place of a video screen.

Figure 3:
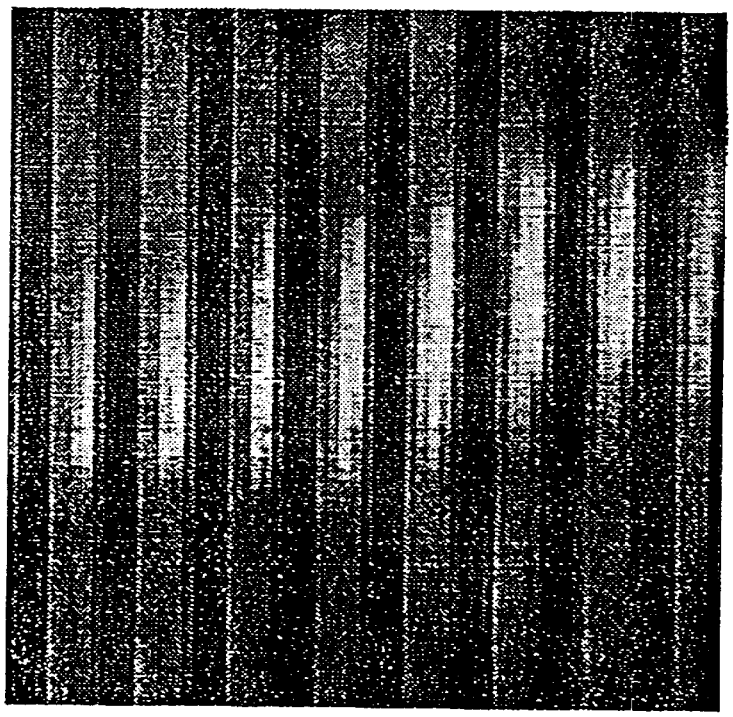
FIG. 3 is a section of a lenticular-integral image.
Figure 4:
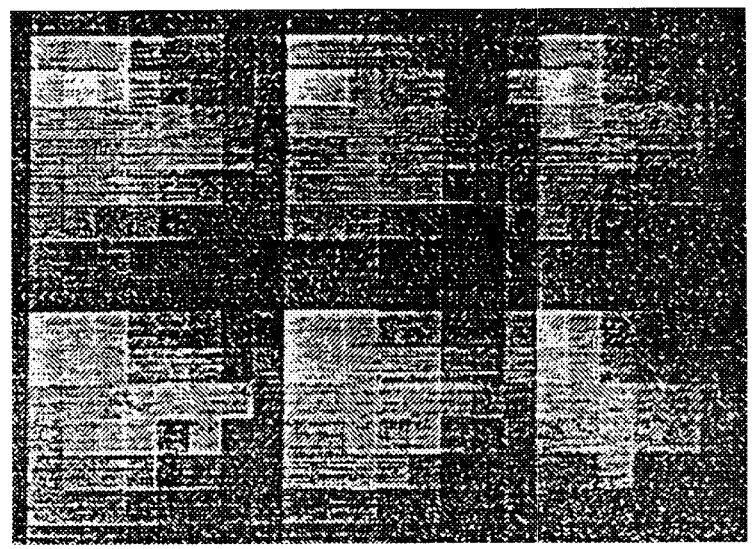
FIG. 4 is a section of a full-integral image.

FIGS. 3 and 4 show sections (magnified) of coded images produced by arrangements such as that illustrated in FIGS. 1 and 2. Instead of an integral coding arrangement, using spherical microlenses, a lenticular arrangement can be used, using cylindrical lenses, the lenses being arranged with their axes vertical to correspond to the horizontal spacing of the eyes in binocular vision. FIG. 3 shows a 64×64 pixel section of a lenticular-integral image, while FIG. 4 shows six sub-images of a full-integral image each of 8×8 pixels.

It is with the recording, transmission, storage, reception, retrieval and display of such coded images as are seen in FIGS. 3 and 4 that this invention is concerned.

The minimum bandwidth initially believed to be required for the transmission of moving integral 3D images was 42 GHz. In fact, full colour 3D display is possible using a receiver with a bandwidth no greater than is required for HDTV. A compression ratio of approximately 4:1 is required for the transmission of integral 3D TV pictures. Higher compression rates than 4:1 are possible, enabling higher quality display (more pixels per sub-image) and more efficient use of transmission bandwidth or storage space, i.e. allowing several TV picture channels to have the same broadcast channel.

Conventional compression algorithms for HDTV, such as transform and sub-band coding techniques, achieve compression by decorrelating in the spatial and/or temporal correlation domains. A totally white screen, of course, is totally correlated, while a picture with areas of more or less solid colour is less, but still fairly well correlated spatially. Successive frames of a television transmission are usually very well correlated temporally, even with high-action scenarios, and there is substantial scope for compression of ordinary 2D colour picture information on all those accounts.

The addition of the third spatial dimension would appear to pose substantial problems, but the invention overcomes the perceived difficulties by working with the strongly correlated—as will be evident from FIGS. 3 and 4—sub-images, i.e. portions of the full image produced by the optical system described with reference to FIGS. 1 and 2.

The invention comprises compressing the electronic data produced by the CCD array 21 (or other electronic imaging device) by eliminating redundancies between these strongly correlated sub-images before storing or transmitting the compressed data.

The compression, further according to the invention, is reversible so as to expand the data to recreate the sub-images for viewing as a 3D image through an optical viewing system such as either of the systems A, B of FIG. 1.

Figure 5:
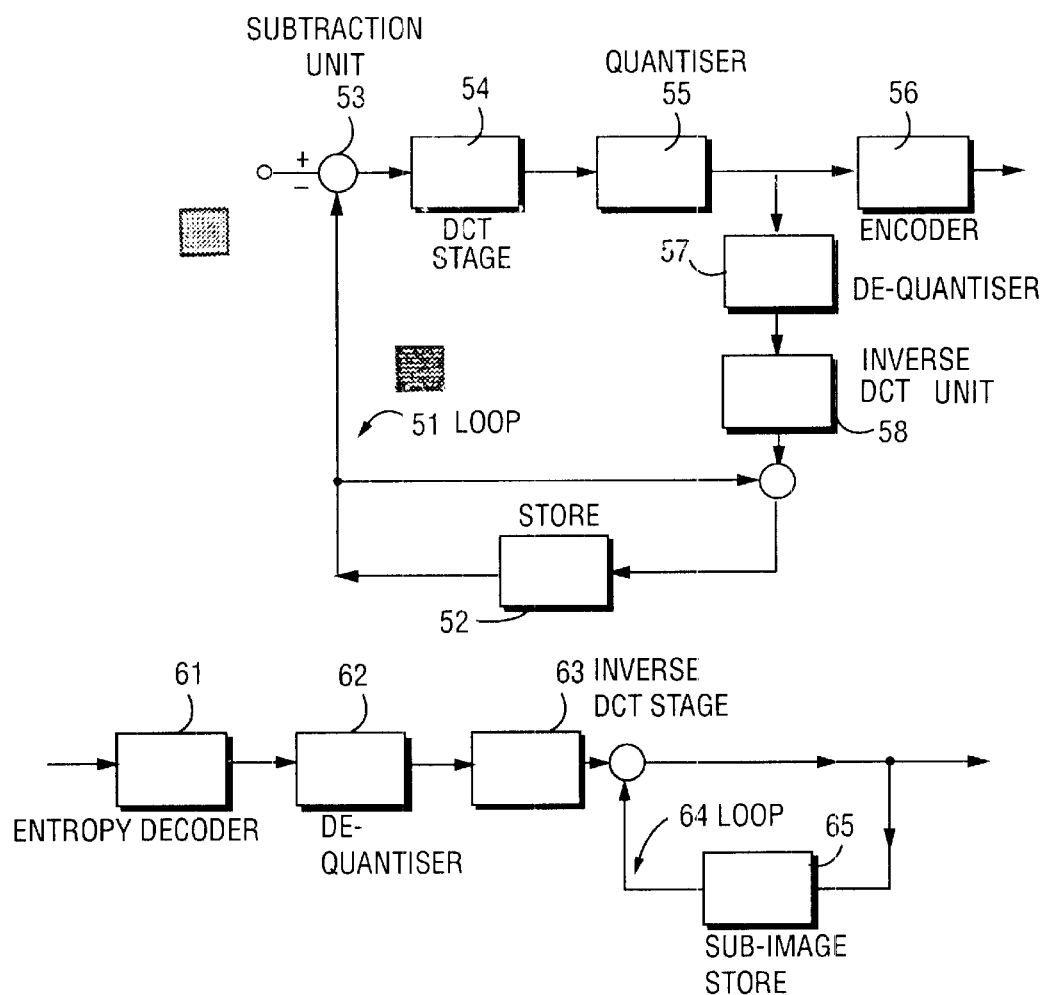
FIG. 5 is a diagrammatic illustration of a first coding scheme for still 3D image data compression.
Figure 6:
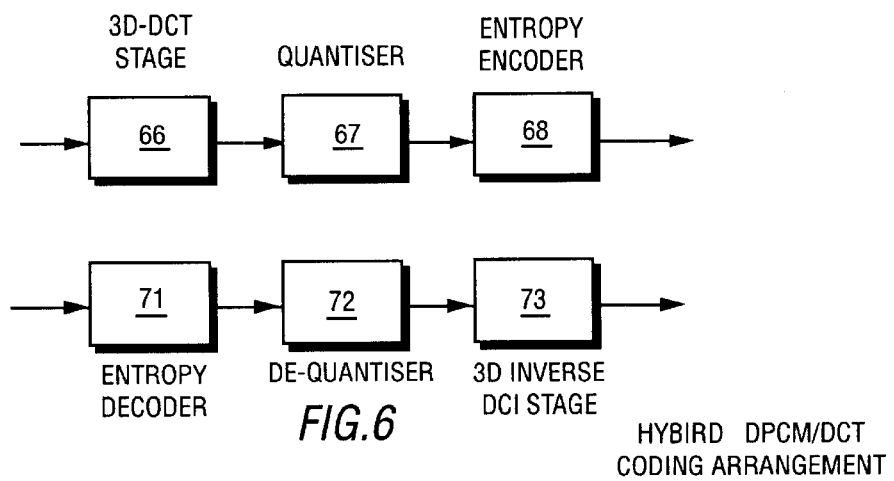
FIG. 6 is a diagrammatic illustration of a second coding scheme for still 3D image data compression.

FIGS. 5 and 6 illustrate two still 3D image coding schemes, utilising two different decorrelation techniques namely:

small sub-image data sectors (such as the six sectors seen in FIG. 4) generated by the optical system are fed successively into an encoder where a previously coded sub-image is subtracted from the most recently fed-in sub-image by a differential pulse code modulation (DPCM) technique, and intra-sub-image redundancies are eliminated using a discrete cosine transform (DCT) technique.

FIG. 5, which shows both encoder and decoder (as do FIGS. 6 and 7) illustrates a hybrid DPCM/DCT coding scheme in which sub-images are input (as electronic data representing colour/brightness values) into a loop 51 in which a previous sub-image is held in a store 52 to be fed to a subtraction unit 53—the DPCM step. The resulting partially decorrelated sub-image is fed to a DCT stage 54 where intra-sub-image redundancies are eliminated.

The thus further decorrelated sub-image data then go to a quantiser 55 where all low value pixel values are set to zero and all others are reduced to the nearest one of a small set of discrete values. The quantised data are then fed to an entropy encoder 56 that achieves further gain in compression by evaluating the statistics of the occurrence of non-zero coefficient values and representing the quantised data with regard to their statistical significance is such a way as to minimise output data quantity.

The quantised data are fed, in the loop 51, to a de-quantiser 57 that restores the pre-quantised values, then to an inverse DCT unit 58 that effectively restores the sub-image to be passed to the store 52.

The final coded sub-image data is output from the entropy coder 56.

The DCT coder 54 for intra-sub-image correlates applies the formula $$F(u, v) = \frac{D_u D_v}{8} \sum_{l=o}^{7} \sum_{m=0}^{7} f(l, m) \cos \frac{\pi u(2l + 1)}{16} \cos \frac{\pi v(2m + 1)}{16}$$

where f(l,m) is the input data array formed from an 8×3 sub-image difference;

F (u,v) is the resulting transform coefficient array; and $D_s$=1 if s=0, $\sqrt{2}$ if S>0

The decoder illustrated in FIG. 5 comprises an entropy decoder 61 receiving the input coded sub-images and passing them to a de-quantiser 62 thence to an inverse DCT stage 63 and finally into a loop 64 with a sub-image store 65 for the inverse DPCM stage, the restored sub-image being output from the loop 64.

In between the coder and decoder, of course, will be a UHF transmission of the compressed data and/or a storage on e.g. magnetic or video disc recording medium.

FIG. 6 shows a purely DCT encoding scheme comprising a 3D -DCT stage 66, quantiser 67 and entropy encoder 68 outputting the compressed data. The decoder comprises the inverse elements, namely entropy decoder 71, de-quantiser 72 and 3D inverse DCT stage 73.

The 3D-DCT stage for four 8×8 pixel sub-images is $$F(u, v, w) = \frac{D_u D_v D_w}{16} \sum_{l=0}^{7} \sum_{m=0}^{7} \sum_{7=0}^{3} f(l, m, n) \cos\frac{\pi u(2m+1)}{16} \cos\frac{\pi v(2n+1)}{16} \cos\frac{\pi w(2l+1)}{16}$$

The third transform dimension takes account of inter-sub-image redundancies such that a small group of sub-images is completely decorrelated in a single transform calculation.

The arrangements discussed with reference to FIGS. 5 and 6 are suitable for data compression for still pictures. An arrangement for compression of moving integral 3D-TV pictures is essentially the same as the arrangement of FIG. 5 except that the 2D DCT stage 54 is replaced by a 3D DCT stage and the 2D IDCT stages 58 and 63 are replaced by 3D IDCT stages.

Figure 7:
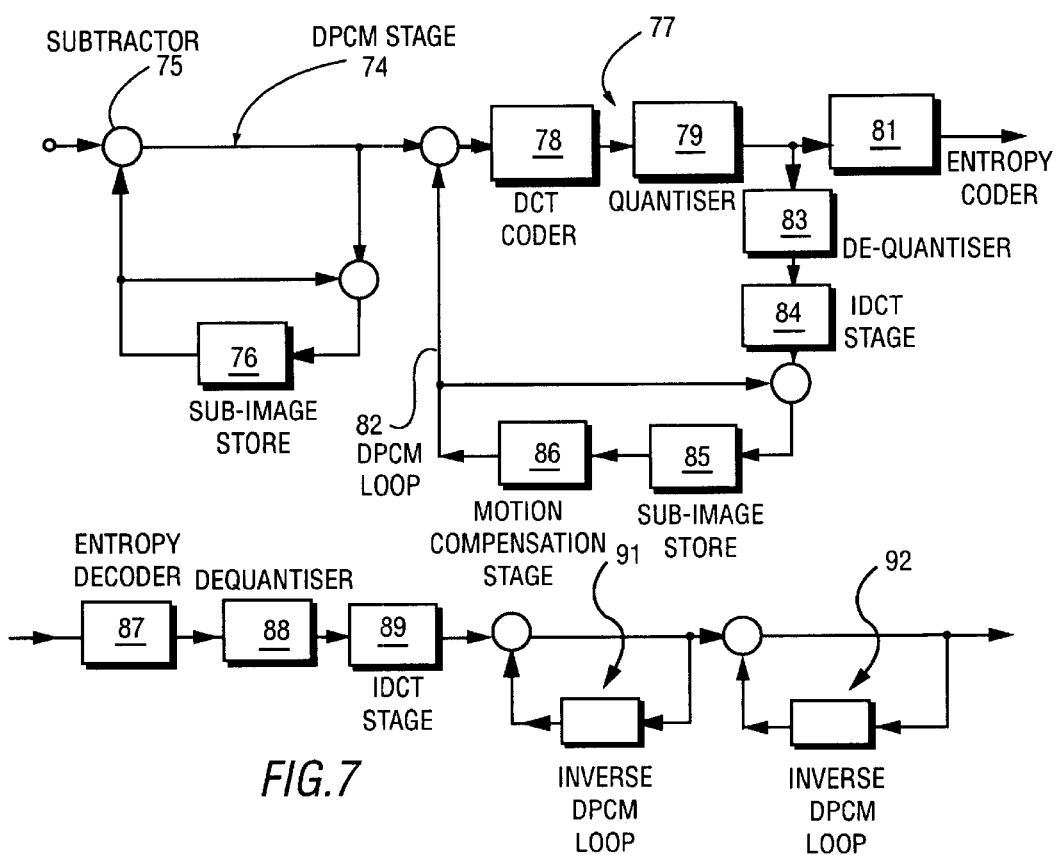
FIG. 7 is a diagrammatic illustration of a coding scheme for moving 3D image data compression.

FIG. 7 illustrates a further coding scheme for moving integral 3D images.

A DPCM stage 74 has a substractor 75 and sub-image store 76, as before. This passes DPCM decorrelated sub-images to a hybrid DPCM/DCT coding arrangement 77 with a DCT coder 78, quantiser 79 and entropy coder 81 together with a DPCM loop 82 with dequantiser 83 and IDCT stage 84, sub-image store 85 and, additionally, a motion compensation stage 86. DPCM is used in this scheme to decorrelate in the temporal and inter-sub-image domains, DCT to decorrelate intra-sub-image redundancies.

The decoder has an entropy decoder 87, a dequantiser 88 and IDCT stage 89 with two inverse DPCM loops 91, 92.

Figure 8:
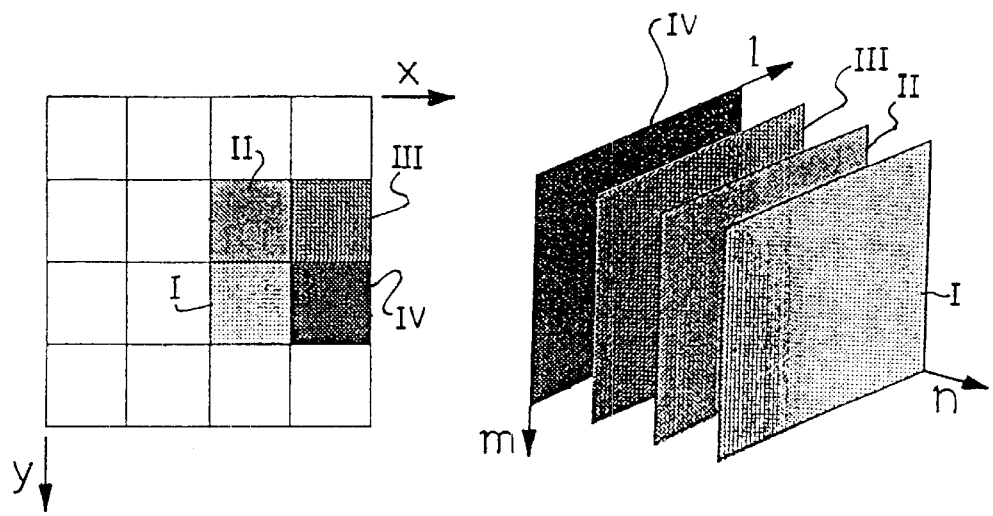
FIG. 8 is a diagrammatic illustration of a scheme for an input structure for the coding schemes of FIGS. 5 to 7.

FIG. 8 illustrates, for 3D-DCT-based schemes, a strategy for the extraction of a group of sub-images from an integral image, the sub-images I, II, III, IV being extracted one after the other and assembled (notionally, as frame data) in the order to be fed to the coding arrangement. Selection of groups of neighbouring sub-images maximises the inter-sub-image correlation, allowing decorrelation to reduce the information required to be transmitted to a minimum.

Figure 9:
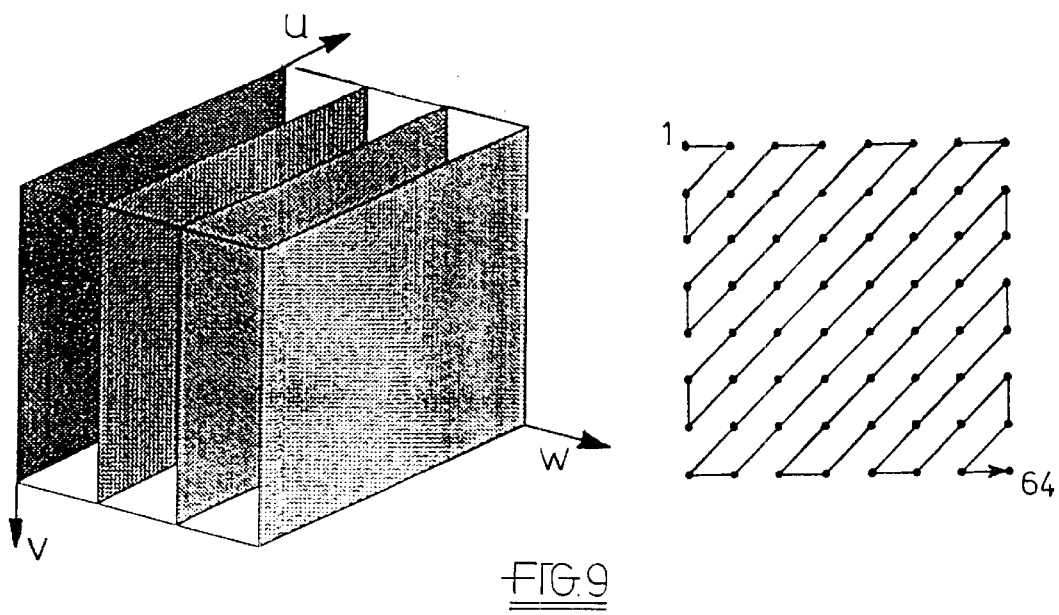
FIG. 9 is a diagrammatic illustration of a scanning strategy used in the coding schemes of FIGS. 5 to 7.

FIG. 9 illustrates an entropy-coder scanning strategy for four 8×8 pixel transformed and quantised sub-images. Each plane of the processed sub-image group is scanned in turn over the u and v axis directions according to the scanning scheme illustrated in the right hand part of this figure. This zig-zag diagonal scanning statistically increases the zero run lengths leading to enhancement of compression by entropy coding.

Using the techniques described and illustrated, moving 3D colour pictures can be transmitted within a standard UHF terrestrial TV bandwidth, the images being true colour, unlike holography, and the 3D imaging being integral, with no flipping over a wide viewing angle.

The system described is compatible with 2D television receivers inasmuch as without the optical decoding arrangements the picture is identical to what the comparable 2D picture would be but would appear slightly out of focus. This can be compensated for by an image enhancement technique to sharpen the focus.

What is claimed is:

1. A method for storing and/or transmitting 3D image information comprising the steps of:
   producing an image to be stored and/or transmitted comprising an array of strongly correlated neighboring sub-images;
   casting the sub-images on to a pixel screen capturing the sub-images as electronic data;
   compressing the electronic data by eliminating redundancies associated with the sub-images;
   storing and/or transmitting the compressed data;
   the compression being reversible in a decorrelating technique so as to expand the data to re-create the sub-images for viewing as a 3D image through an optical viewing system comprising a microlens or lenticular array;
   wherein the microlens or lenticular array is adapted for integral image recording during compression and a 3D-DCT coding scheme is applied directly to groups of neighboring sub-images, where for each group, the first two dimensions removing intra-sub-image redundancies and the third dimension eliminating inter-sub-image redundancies.

2. A method according to claim 1, in which the image is of a scene produced using an optical imaging system comprising a microlens or lenticular array of small spherical or cylindrical lenses each of which images the scene from a slightly different viewpoint.

3. A method according to claim 1, in which the image is electronically generated or partially electronically generated.

4. A method according to claim 1, in which photographic images are electronically scanned and captured as electronic data.

5. A method according to claim 1, in which redundancies between sub-images are eliminated.

6. A method according to claim 1, in which redundancies within sub-images are eliminated.

7. A method according to claim 1, in which small sub-image data sectors generated by the optical system are fed successively into an encoder where a previously coded sub-image is subtracted from the most-recently fed-in sub-image by a differential pulse code modulation (DPCM) coding technique.

8. A method according to claim 7, in which redundancies are eliminated within the sub-images themselves.

9. A method according to claim 8, in which the intra-sub-image redundancies are eliminated using a discrete cosine transform (DCT) coding scheme.

10. A method according to claim 1, in which a quantisation function is applied to the coded data that sets small values to zero and transforms all other non-zero values to nearest values in a set of preferred values.

11. A method according to claim 1, in which the coded data are further entropy encoded.

12. A method according to claim 1, for storing and/or transmitting moving 3D image information using a DPCM coding technique decorrelating image data in the temporal domain and 3D-DCT eliminating spatial redundancies.

13. A method according to claim 1, in which a 2D-DCT scheme correlates intra-sub-image spatial redundancies and a DPCM technique decorrelates inter-sub-image data both in the spatial and temporal domains.

* * * * *